Figure 1:
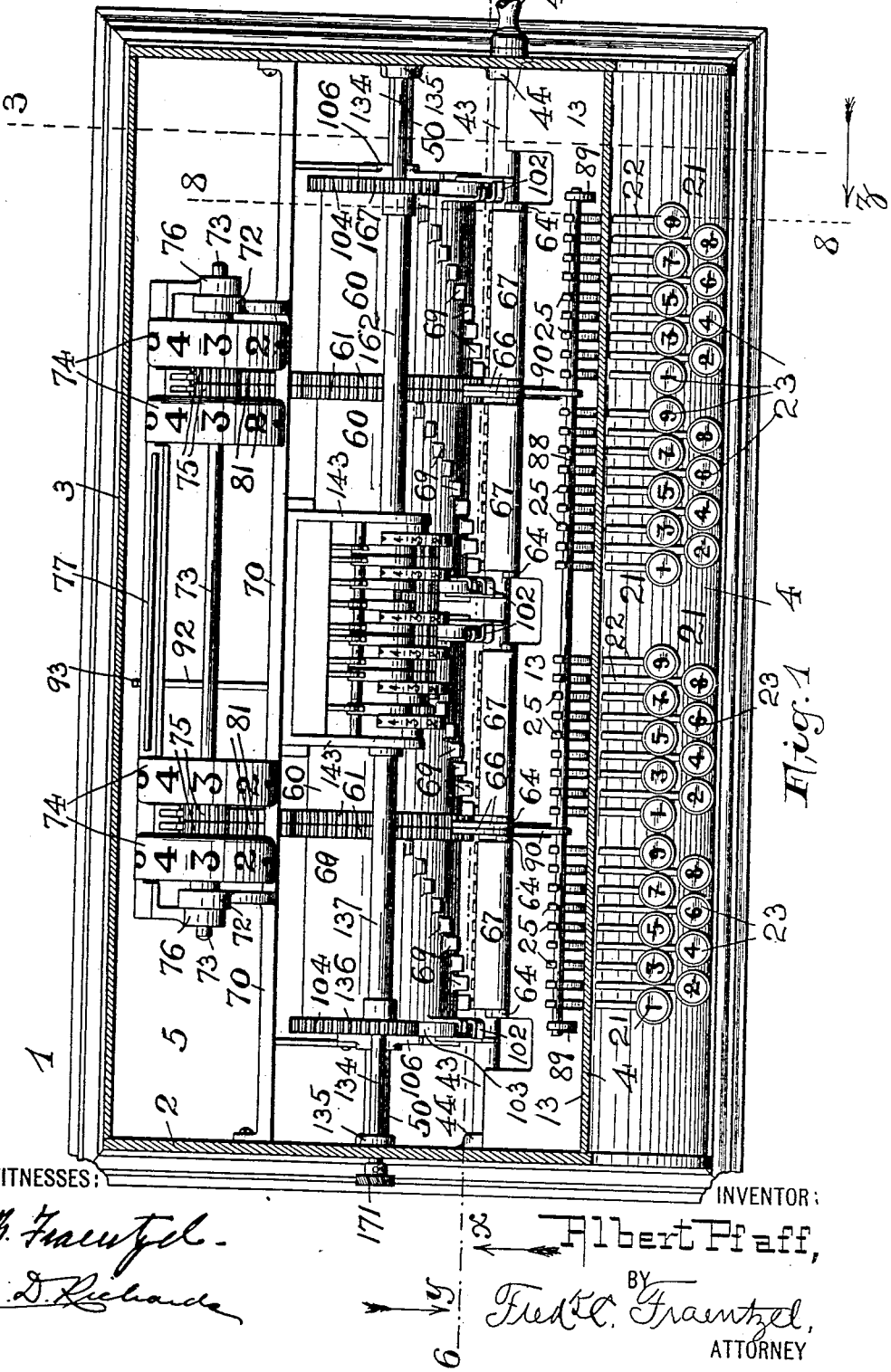

No. 759,467. PATENTED MAY 10, 1904.
A. PFAFF.
CASH REGISTER.
APPLICATION FILED APR. 15, 1903.
NO MODEL. 9 SHEETS—SHEET 1.

WITNESSES: INVENTOR:
Albert Pfaff,
BY
Fred C. Fraentzel,
ATTORNEY

No. 759,467. PATENTED MAY 10, 1904.
A. PFAFF.
CASH REGISTER.
APPLICATION FILED APR. 15, 1903.
NO MODEL. 9 SHEETS—SHEET 2.

WITNESSES: INVENTOR:
Albert Pfaff,
BY
ATTORNEY

No. 759,467. PATENTED MAY 10, 1904.
A. PFAFF.
CASH REGISTER.
APPLICATION FILED APR. 15, 1903.
NO MODEL. 9 SHEETS—SHEET 4.

WITNESSES: INVENTOR:
Albert Pfaff,
BY
ATTORNEY

No. 759,467. PATENTED MAY 10, 1904.
A. PFAFF.
CASH REGISTER.
APPLICATION FILED APR. 15, 1903.
NO MODEL. 9 SHEETS—SHEET 5.

WITNESSES: INVENTOR:
Albert Pfaff,
BY
ATTORNEY

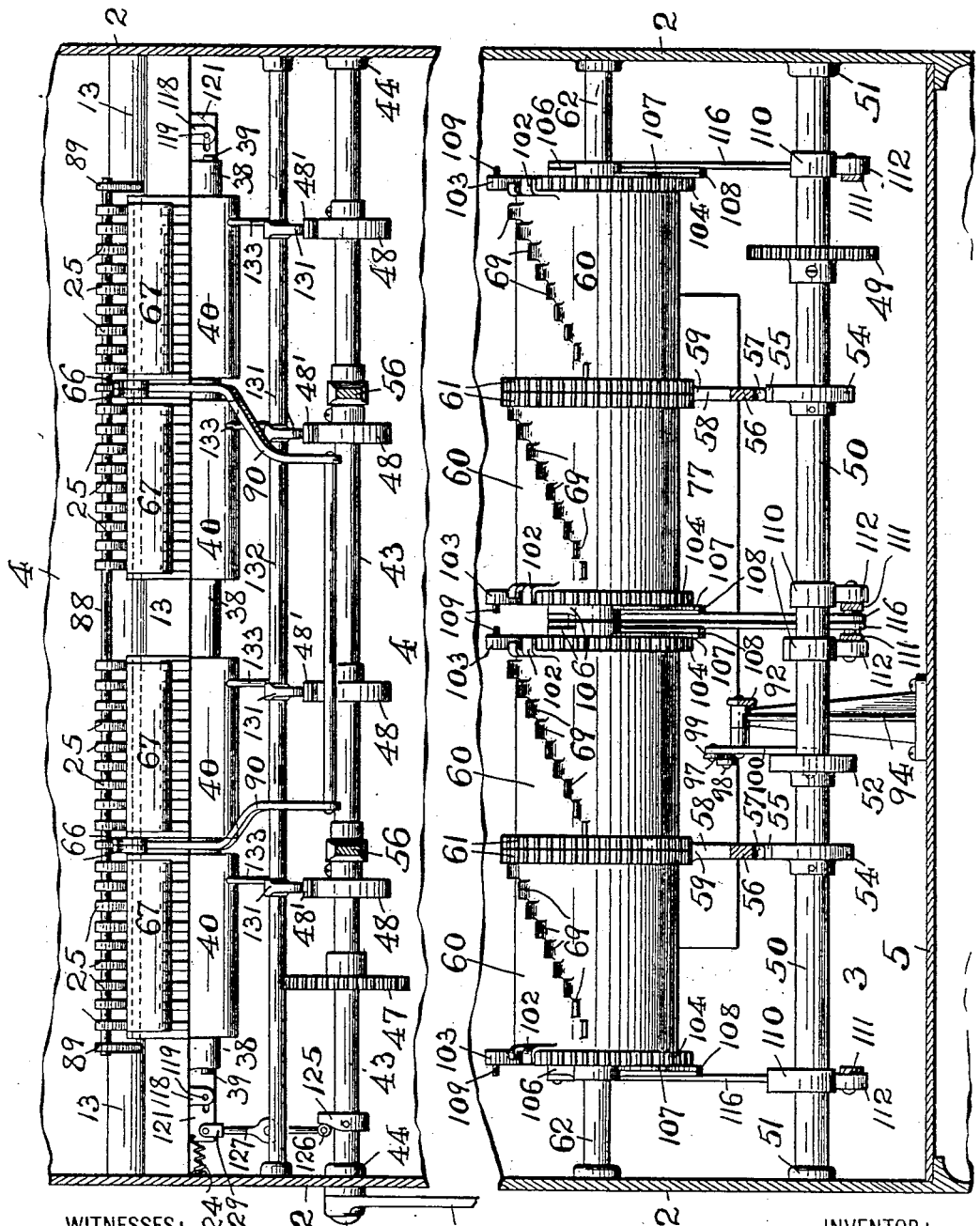

No. 759,467. PATENTED MAY 10, 1904.
A. PFAFF.
CASH REGISTER.
APPLICATION FILED APR. 15, 1903.
NO MODEL. 9 SHEETS—SHEET 7.

WITNESSES:
INVENTOR:
Albert Pfaff,
BY
ATTORNEY

No. 759,467. PATENTED MAY 10, 1904.
A. PFAFF.
CASH REGISTER.
APPLICATION FILED APR. 15, 1903.
NO MODEL. 9 SHEETS—SHEET 8.
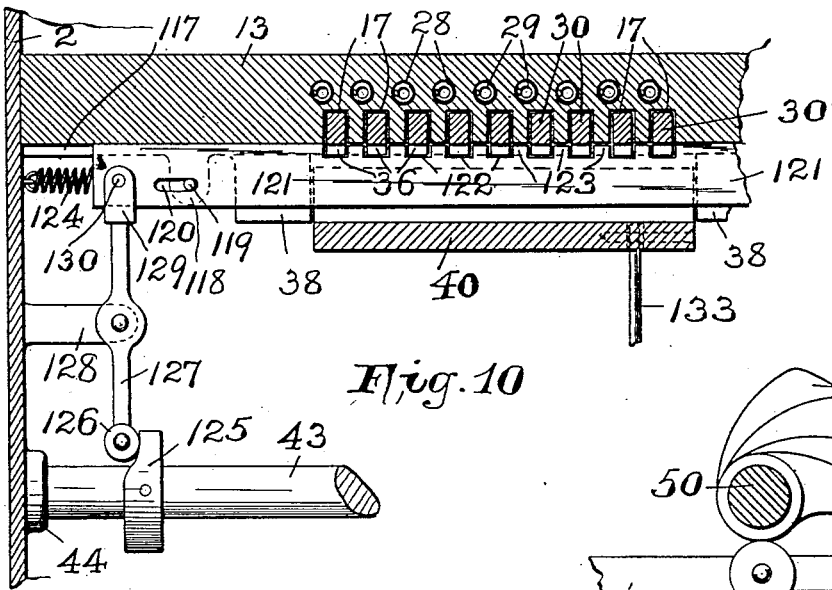
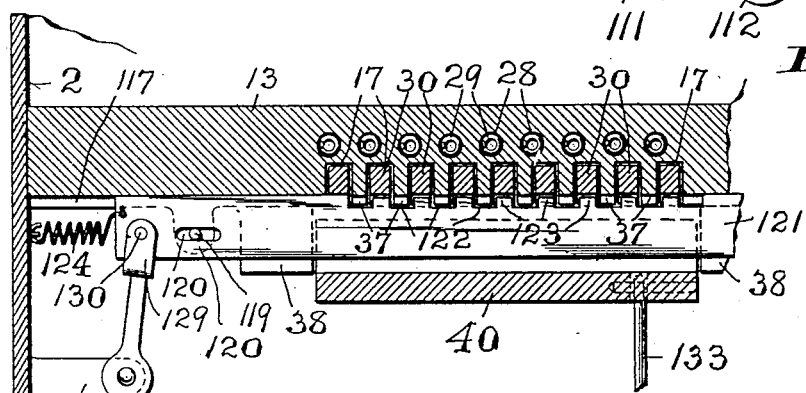
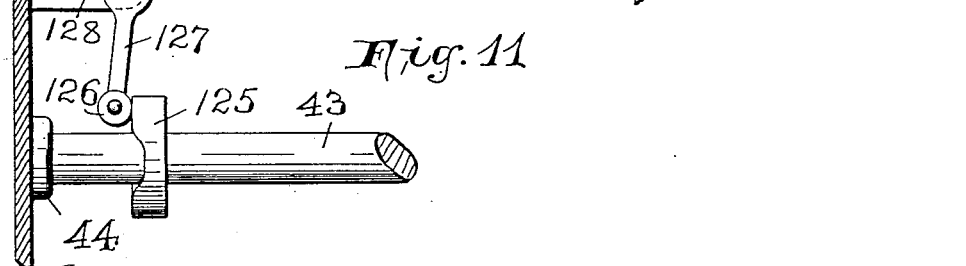
WITNESSES:
INVENTOR:
Albert Pfaff,
BY
Fred C. Fraentzel,
ATTORNEY

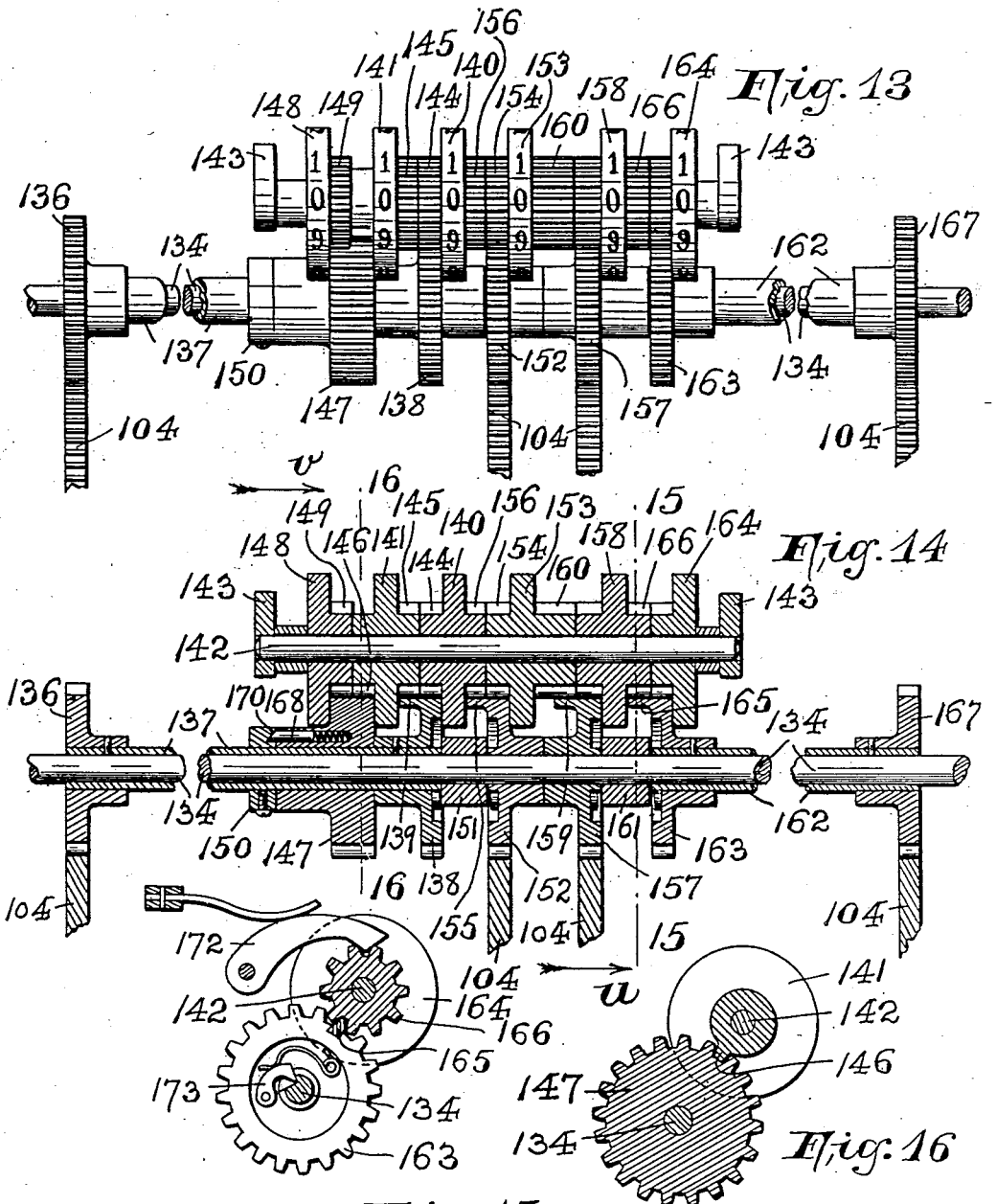

No. 759,467.

Patented May 10, 1904.

UNITED STATES PATENT OFFICE.

ALBERT PFAFF, OF NEWARK, NEW JERSEY.

CASH-REGISTER.

SPECIFICATION forming part of Letters Patent No. 759,467, dated May 10, 1904.

Application filed April 15, 1903. Serial No. 152,649. (No model.)

*To all whom it may concern:*

Be it known that I, ALBERT PFAFF, a citizen of the United States, residing at Newark, in the county of Essex and State of New Jersey, have invented certain new and useful Improvements in Cash-Registers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates to improvements in cash-registers; and the invention refers more particularly to a novel cash-register mechanism in which a set of key-levers bearing numbers and other symbols on their finger-pieces are employed for setting a controlling mechanism to permit other mechanism adapted to be actuated by means of a crank on a main shaft to be released and operated to rotate one or more indicating drums or cylinders, whereby the amount of a purchase or a sale made is exposed to view.

My present invention has for its principal objects to provide an efficient, simple, and cheaply-constructed cash-register in which the parts of the controlling and the indicating-drum mechanism have been reduced to a minimum, and hence the workings of the said mechanisms and devices are effective and the parts of the mechanism are less liable of getting out of order.

A further object of this invention is to provide a cash-register mechanism in which any errors accidentally made by the operator in depressing the wrong key-lever or key-levers can be corrected before either one or more of the indicating drums or cylinders have been actuated or before the indicating-disks of an adding or registering device which may be used with the apparatus have been actuated.

Other objects of the present invention not at this time more particularly enumerated will be clearly understood from the following detailed description of the same.

My invention therefore consists in the novel construction of cash-register hereinafter fully described; and, furthermore, this invention consists in the novel features, structure, and the general arrangements and combinations of the devices, as well as in the details of the construction of the various parts of the said devices, all of which will be more fully set forth in the following specification and then finally embodied in the clauses of the claim which form a part of and are appended to the said specification.

The invention is fully illustrated in the accompanying sheets of drawings, in which—

Figure 2:
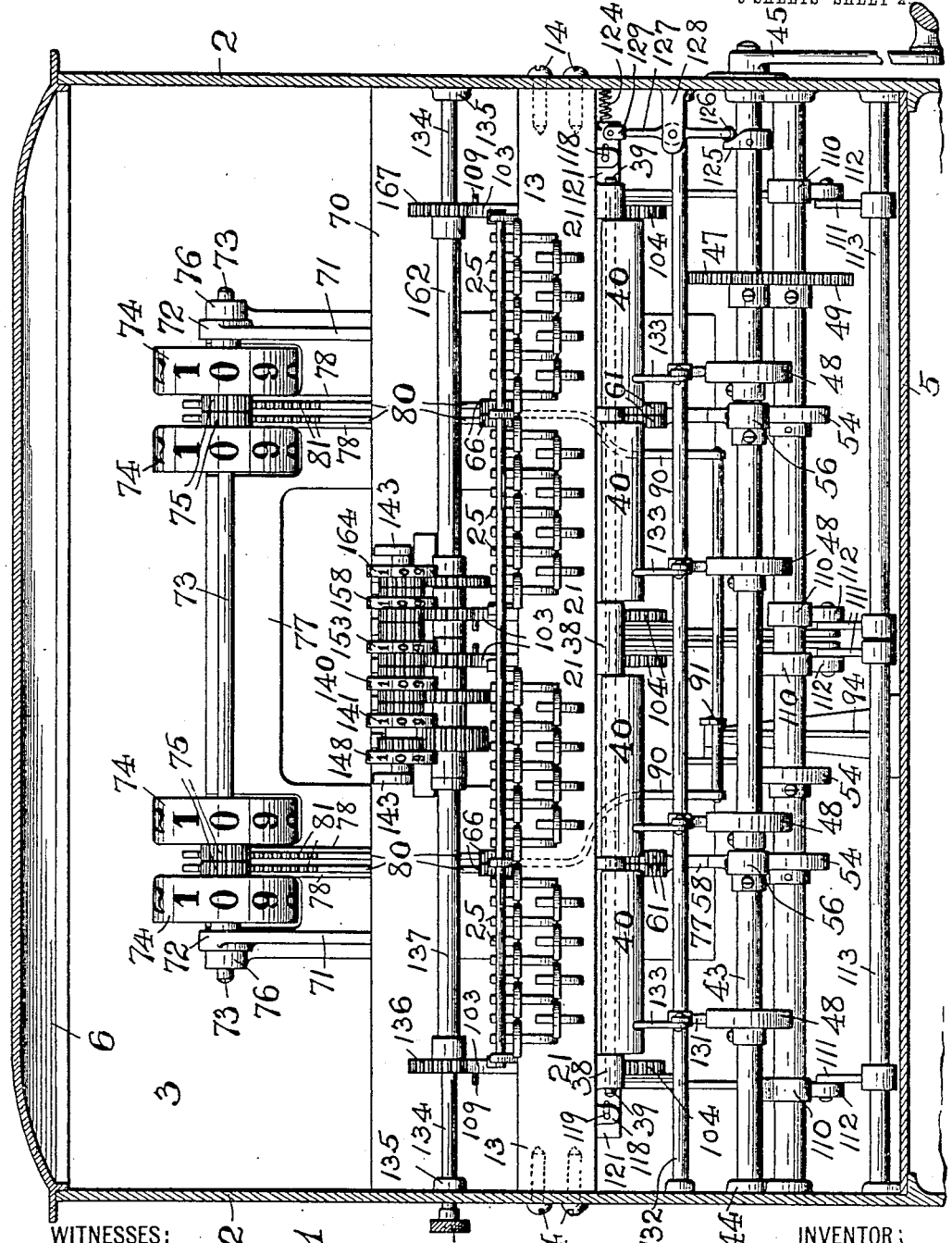
Figure 3:
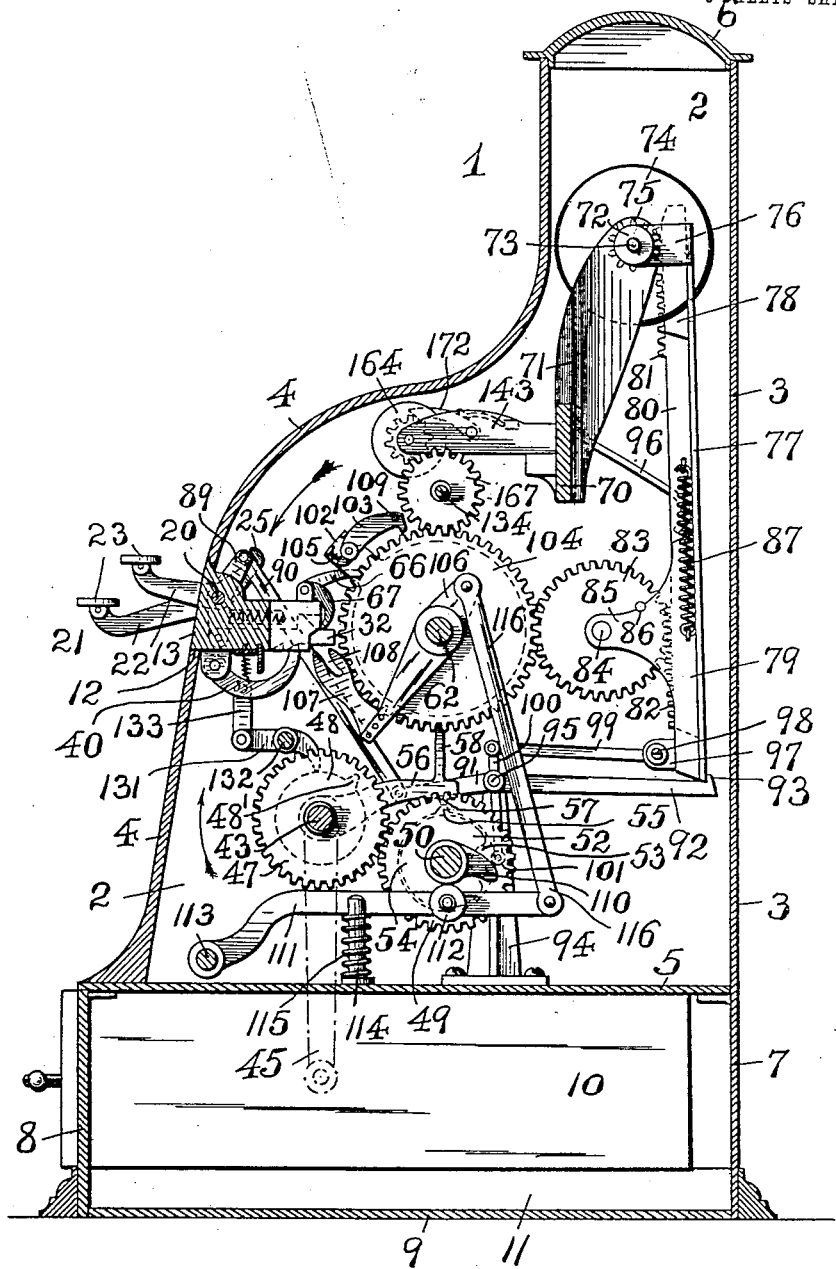
Figure 4:
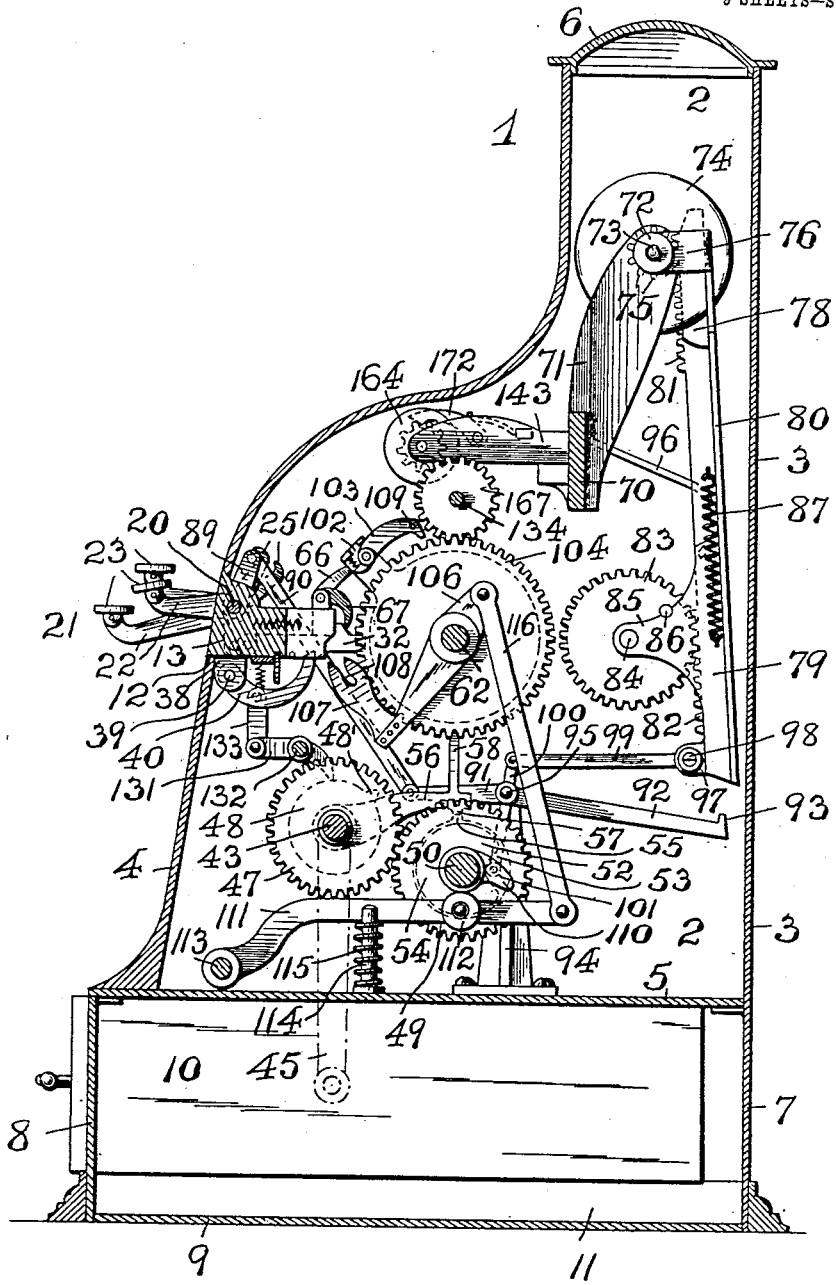
Figure 5:
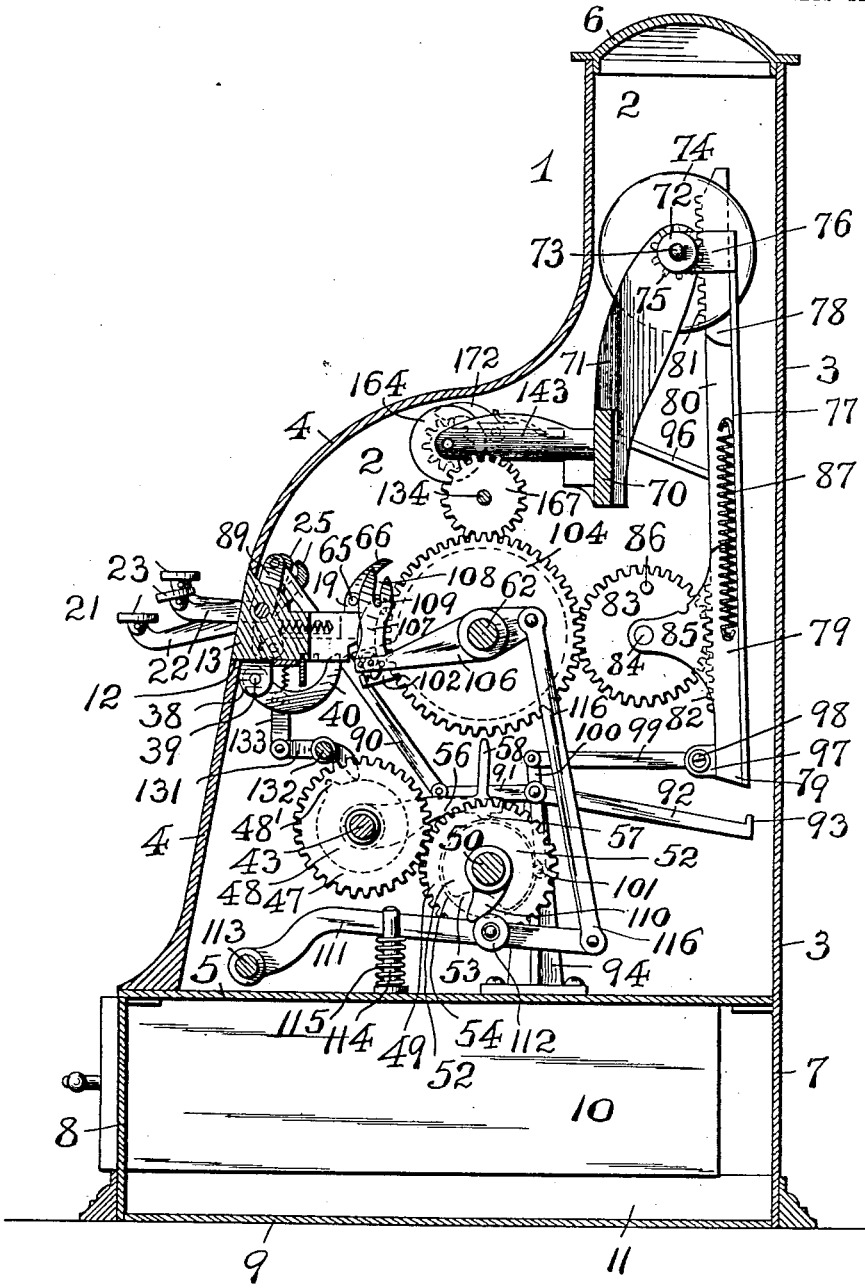
Figure 8:
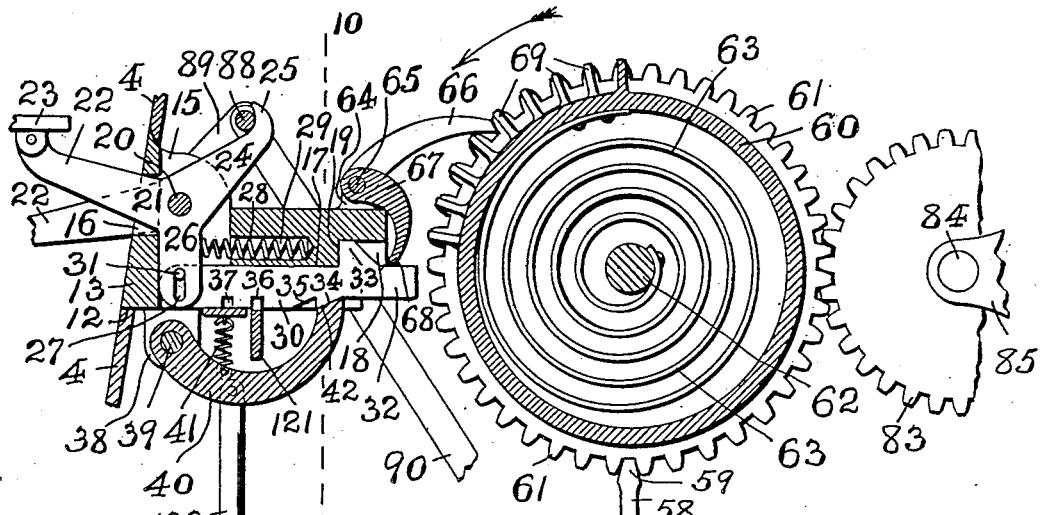
Figure 9:
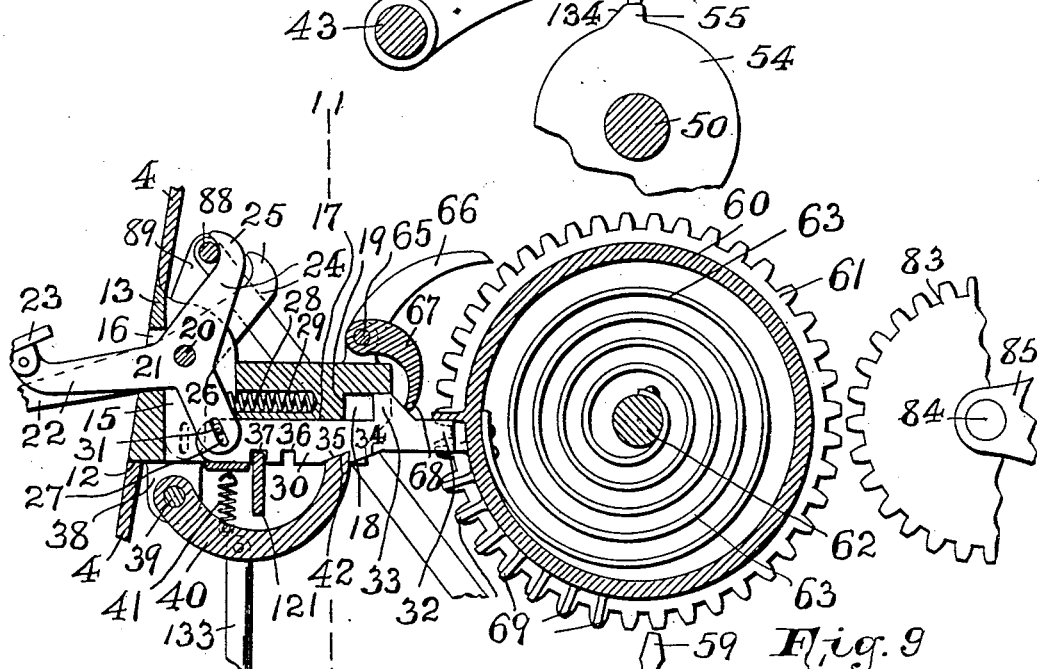

Figure 1 is a plan or top view of the various mechanism and devices of my novel construction of cash-register, the register-casing being represented in horizontal section. Fig. 2 is a front elevation of the said mechanisms and devices with the register-casing represented in longitudinal vertical section. Fig. 3 is a transverse vertical section taken on line 3 3 in said Fig. 1, representing the various key-levers, the controlling mechanism which is to be set by the movement of one or more of the key-levers, and the crank-operated actuating mechanism for rotating one or more of the indicating drums or cylinders, all in their normal initial and inactive positions. Fig. 4 is a similar section of the same mechanism and devices, representing one of the key-levers depressed and the controlling mechanism in one of its set positions to permit the mechanism for rotating the indicating drum or drums to be actuated by a crank-operated shaft, but said last-mentioned mechanism in this view still being shown in its normal initial position. Fig. 5 is a transverse vertical section of the several mechanisms and devices represented in said Figs. 3 and 4, but all the said mechanisms and devices being illustrated in their operated positions. Fig. 6 is a detail longitudinal vertical section taken on line 6 6 looking in the direction of arrow *x* in Fig. 1, but the indicating drums or cylinders and the registering device being omitted from this view. Fig. 7 is a similar section taken on line 6 6 in said Fig. 1 looking in the direction of arrow *y*. Fig. 8 is a transverse vertical section taken on line 8 8 in said Fig. 1 looking in the direction of arrow *z*, illustrating, on an enlarged scale, one of the controlling drums or cylinders of the controlling mechanism and one of the key-levers and parts coöperating therewith, all being represented in their normal initial positions; and Fig. 9 is a similar view of the same mechanism and devices, but the parts being represented in their actuated positions. Fig. 10 is a longitudinal vertical section taken on line 10 10 in Fig. 8 of the drawings, illustrating more particularly the general construction of the key-lever-locking mechanism; and Fig. 11 is a similar view of the parts represented in said Fig. 10, but the said section being taken on line 11 11 in Fig. 9 of the drawings. Fig. 12 is a diagrammatical sectional representation of a shaft provided with a set of four differently spaced or shaped cams for actuating the mechanism, whereby the indicating-drums, as well as the registering devices, are actuated in succession one after the other. Fig. 13 is a face view of the registering device employed with the cash-register embodying the principles of this invention. Fig. 14 is a longitudinal vertical section of the same. Fig. 15 is a transverse vertical section taken on line 15 15 in Fig. 14 looking in the direction of arrow $u$, and Fig. 16 is a similar section taken on line 16 16 in said Fig. 14 looking in the direction of the arrow $v$.

Similar characters of reference are employed in all of the said hereinabove-described views to indicate corresponding parts.

In the said drawings the reference character 1 indicates the exterior shell or casing of the cash-register, the said shell or casing being of any desirable shape and ornamentation, comprising the sides 2, the back 3, the front 4, a base-plate 5, and a cover or top 6, these parts being preferably separably connected for the purpose of getting at the mechanism to make repairs when necessary.

The lower part of the back 3 extends below the base-plate 5, as at 7, and 8 indicates a lower front plate, the said part 7 and plate 8 being connected by a bottom 9 to provide a suitable chamber for a money-drawer 10, which moves on cleats 11 in said chamber and is adapted to be pulled out from an opening in the plate 8. The front 4 of the shell or casing is provided with an open part 12, in which I have arranged a block or plate like member 13, which extends along the entire front of the casing or shell, as clearly illustrated in Figs. 1 and 2, and is held in place, preferably, by means of screws 14, as shown.

Referring more particularly to Figs. 8 and 9 of the drawings, it will be seen that the body of the said block or plate like member 13 is made with an open part 15, with which communicate a number of openings or slots 16, which extend to the front of the said block or plate like member. In communication with the lower portion of the said open part 15, as will be seen more particularly from an inspection of Figs. 10 and 11, are a number of rearwardly-extending guides 17, each guide being formed with an enlarged open portion 18 to provide a shoulder 19, as illustrated and for the purposes to be presently described.

In the open part 15 of the block or plate like member 13 I have secured a rod or bar 20, on which are placed, usually in sets of four, a number of key-levers 21, nine of such levers being used with each set. Each key-lever 21 is made with a forwardly-projecting arm 22, extending from the slot or opening 16 and provided upon its free end with a suitable finger-piece 23, bearing the numbers from "1" to "9" inclusive. Each key-lever 21 is also made with a rearwardly and upwardly extending arm 24, having a hook-shaped end 25, and also with a downwardly-extending arm 26, provided with a slot 27 in its lower end portion. The various key-levers 21 are held in their normally inactive positions by coiled or other suitable springs 28, preferably in the manner represented in Figs. 8 and 9, each spring 28 being arranged in a socket 29 in the member 13 and bearing against the arm 26. Slidably arranged in each guide 17 is a bolt 30, each bolt being provided with a pin 31, arranged in the slot 27 of the arm 26, whereby when the key-lever 21 is actuated by the operator the said arm 26 and its pin 31 will force the said bolt 30 in an inward direction in the guide 17, as clearly indicated in Fig. 9 of the drawings. Each bolt 30 is also made with a nosing or holding portion 32, formed with an upwardly-extending projection 33, which acts as a stop when brought against the shoulder 19 by the action of the spring 28, whereby the return movement of the actuated bolt is limited and the bolt is caused to remain in its proper normal initial position after the operator has removed the pressure from the depressed arm 22 and the controlling mechanism of the device has returned to its initial position at rest. Each bolt is also made with a tooth-shaped member 34, back of which is a recess 35 and with other recesses or grooves 36 and 37 in the bottom. At suitable intervals the said block or plate like member 13 is formed with downwardly-extending perforated ears or lugs 38 for the reception of a rod 39. Upon this rod and between the various lugs or ears 38 are pivotally arranged four curved plates 40, one plate for each set of nine key-levers 21 and their nine bolts 30.

The curved plates 40 are made and act in the manner of pawls and are caused under normal conditions by the action of springs 41 to force the chamfered edge 42 of each plate 40 against the inclined edges of the members 34 of each set of nine bolts, thus permitting one or more bolts to be forced in their inward directions by the depression of any one or more of the arms 22 of the key-levers. At the same time the edge 42 of the plate or plates 40 will engage with the recess or recesses 35 of the actuated bolt or bolts 30, and thereby hold the said bolt or bolts in the position represented in Fig. 9 of the drawings.

The main driving-shaft of the apparatus is indicated by the reference character 43, the same being journaled in suitable bearings, as 44, in the sides 2 of the shell or casing and having its one end extending on the outside of the said casing and provided with a crank lever or handle 45. Suitably secured upon this shaft 43 is a gear 47 for the purposes to be presently described and a set of disks or cams 48, each being provided with a stud or projection 48'. As long as neither of the key-levers 21 is depressed the controlling mechanism is not operated, although it may be possible to turn the crank 45, all of which will be more particularly described hereinafter. In mesh with the gear 47 on said main shaft 43 is a gear 49, arranged upon a shaft or spindle 50, also journaled in bearings 51 in the sides of the shell or casing. Upon this shaft 50 is a cam-disk 52, provided in its surface with a depression 53, and 54 represents other disks each provided with a stud or projection 55, as shown. Normally the said stud or projection 55 of each disk 54 extends in an upward direction, as indicated in Fig. 3 of the drawings, and resting upon the upper flat surface of each stud or projection 55 is a correspondingly-placed stud or projection 57, formed on an arm 56, which is loosely pivoted upon the main shaft 43. Each arm 56, of which there are two in the present case, has an upwardly-projecting stem or post 58, the upper end of each stem or post 58 being widened out, as at 59, (see Fig. 6,) so as to engage the gear-teeth 61 of the adjacently-placed controlling drums or cylinders 60. Each drum or cylinder 60 is preferably made hollow and is movably arranged upon a rod 62, fixed in the sides 2 of the shell or casing. Secured to the inner cylindrical surface of each drum or cylinder 60 and to the said rod 62 is a spiral spring 63, which is wound under tension, so that its normal tendency is to cause the cylinder or drum 60 to move in the direction of the arrow in Fig. 8 when the stem or post 58 is withdrawn from its engagement with the fixed gear-teeth 61 of the drum or cylinder 60. In addition to this holding means the block or plate like member 13, previously mentioned, is made with perforated ears or lugs 64, carrying a rod 65, on which are secured certain dogs or pawls 66, which are in engagement normally with the fixed gear-teeth 61 of the said drums or cylinders 60. Suitably secured upon the same rod 65 and capable of an oscillatory movement thereon are four curved plates 67, made in the manner of a pawl in cross-section and each plate having its lower end portion 68 resting upon the upper surfaces of the nosings 32 of each set of bolts 30, as illustrated in Fig. 8. Each plate 67 is connected with a pawl or dog 66. Now when any one or more of the key-levers 21 are actuated by depression of the respective arm or arms 22 the bolt or bolts 30 move into the position indicated in Fig. 9, causing the edge portion 68 of the plate to ride upon the inclined surface of the projection 33 of the bolt, and thereby withdrawing the proper pawl or dog 66 from its holding engagement with the teeth 61 on the drum or cylinder 60. Each cylinder or drum 60 is provided on its cylindrical surface with nine projections or stops 69, helically disposed over a portion of the said cylindrical surface, the positions of said stops 69 corresponding to the denominations from "1" to "9," inclusive, of each set of key-levers 21 and the purpose of these stops being to limit the movement of the cylinder or drum 60 when actuated by its spiral spring 63 after the said drum has been released from holding contact with the post or stem 58 and the pawl or dog 66.

From an inspection of Figs. 2, 3, 4, and 5 it will be seen that the shell or casing is also provided with a supporting bar or plate 70, on which are upwardly-extending brackets 71, having bearing portions 72, in which is placed a spindle 73. Upon this spindle 73 are arranged the indicating drums or cylinders 74, bearing on their cylindrical surfaces a series of number-symbols from "0" to "9," inclusive. Between each pair of indicating drums or cylinders 74 are two pinions 75 for revolving the spindle 73 in the manner to be presently described. Pivotally arranged on said spindle 73 by means of bearing members 76 is a swinging plate or frame 77, provided with the upper guides 78 and the lower guides 79, in which are arranged reciprocatory racks 80, having the upper gear-teeth 81 in mesh with the pinions 75 and the lower gear-teeth 82 in mesh with certain gears 83 of a spindle 84, journaled in bearing portions 85, extending from the lower portions of the said swing frame or plate 77. Normally this swing frame or plate 77 is in such a position that the respective gears 83 are in mesh with the fixed gear-teeth 61 on the respective controlling drums or cylinders 60. Each gear 83 is also made with a laterally-extending pin 84, which comes in contact with the edge of the bearing portion 85, so as to limit the return movement of each gear 83 and the rack operated from said gear, at the time of the next sale, in the manner presently set forth. This return movement is produced by a suitable spring 87, connected at one end with a rack 80 and at its other end with a part of the frame 77, such as the guide 79, as illustrated. Under normal conditions when the mechanisms of the apparatus are at rest the said gears 83 are in mesh with the fixed gear-teeth 61 of the drums 60. When, however, one or more of the key-levers 21 are depressed, then the arm 24 of the depressed key-lever will force its hook end 25 directly against a rod or bar 88, which is pivotally secured, by means of arms 89, with the rod 20. Suitably secured to the base-plate 5 is a pedestal or bracket 94, having a bearing-pin 95, on which is fulcrumed a lever comprising a pair of arms 91 and 92. The arm 92 has a holding end 93 normally in holding engagement with the lower edge or other suitable portion of the swing-frame 77. The free end of the arm 91 is pivotally connected, by means of a link 90, with the said rod or bar 88. Thus the upward movement of the said rod or bar 88, caused by the movement of the arm 24, will cause the link 90 to raise the arm 91 and correspondingly lower the arm 92, thereby withdrawing the holding portion 93 from its holding engagement with the frame 77. At the same time a strong spring 96, which is secured to the bar or plate 70 and has its free end forcibly in pressing contact with the frame 77, will force said frame backward, and thereby throw the gears 83 out of mesh with the fixed gears 61 of the drums or cylinders 60, and at the same time the spring or springs 87 will return the said gears 83, the racks 80, and indicating-drums 74 to their normal initial or zero position. This is all accomplished during the depressing of a key-lever and before the shaft 43 is operated by the turning of its crank, the drum or drums 60 still being immovably held by the engagement of the stem or post 58 with the gear-teeth 61, and any errors inadvertently made by the depressing of the wrong key lever or levers can be corrected by depressing the proper key lever or levers, whereupon the wrongly-depressed key-levers or key-lever return to their initial and inactive positions without in the least affecting the remaining mechanism of the apparatus. Referring now again to Figs. 3, 4, and 5, it will be seen that the said swing plate or frame 77 is made with a perforated lug or lugs 97, carrying a pin 98, to which is pivotally attached a link 99, the said link 99 being pivotally connected at its opposite end with an arm or lever 100, which oscillates on the pin 95 and has a roller 101 on its lower end. Thus when the parts are in the positions indicated in Fig. 3 of the drawings this roller stands directly in front of the depression 53 of the disk 52, but enters the said depression 53 when the frame 77 swings back to the position indicated in Fig. 4. Now by turning the crank connected with the main shaft 43 the projections 55 on the disks 54 pass from under the projections 57 of the arms 56, whereby the stems or posts 58 are withdrawn from their holding engagement with the fixed gear-teeth 61 of the drums or cylinders 60. The drum or drums 60, which have previously been disengaged from their holding engagement with the pawl or pawls 66, according to the key lever or levers depressed, immediately move in the direction of the arrow indicated in Fig. 3, due to the unwinding action of the spiral spring 63 within the drum, until the proper stop 69, which is in alinement with the previously inwardly-forced bolt 30, comes in stopping engagement with the nosing of the actuated bolt 30, the drum 60 thereby being limited to a movement of one, two, three, four, five, six, seven, eight, or nine teeth or spaces, according to the key depressed, and bearing on its finger-piece 23 the number desired to be exposed on the indicating-drum 74. Immediately after the withdrawal of the stem or post 58 from the gear-teeth 61 the roller or wheel 101 has again moved from the depression 53 of the disk 52 and rolls upon the cylindrical surface of the disk, whereby the arm 100 and link 99 again force the swing plate or frame 77 against the action of the spring 96 in its forward direction and again brings the gears 83 in mesh with the fixed gear-teeth 61 of the drums 60. While the drum or drums 60 are caused to be rotated a lug or arm 102, connected with each drum or cylinder 60, has also moved down to the position indicated in Fig. 5, whereby a pawl or dog 103, normally held away, by means of a spring 105, from a gear disk or wheel 104, loosely arranged upon the shaft or rod 62, as indicated in Fig. 4, is also moved down to the position represented in dotted outline in said Fig. 5. To return the actuated controlling drum or drums 60 to their normal initial positions, and thereby by turning the gear or gears 83 again in mesh with the gear-teeth 61 and moving the proper rack or racks 80 in an upward direction to properly actuate the indicating drum or drums 74, I have pivotally arranged upon the rod 62 along the side of each drum 60 an oscillating arm 106, carrying on one of its ends a finger 107, having a bifurcated or forked end 108, which can be passed over a laterally-extendng pin or lug 109 on the pawl or dog 103, as illustrated in Fig. 5, the inner curved surface of said bifurcated end engaging with the said pin or lug 109, and thereby forcing the nosing of the said pawl or dog 103 in operative engagement with the toothed wheel or disk 104. At the same time the pawl or dog 103 being fast to the lug or arm 102 of the drum 60 the latter will be carried back to its initial position, and in doing so it actuates the gear 83, which in turn moves the rack 80 in its upward direction to turn the indicating-drum 74, and thereby expose to view the proper number or numbers indicating the cash amount of the sale made. The said oscillating arms 106 are actuated from the shaft 50 by means of a set of four cams 110, which are differently spaced upon the said shaft 50, as indicated in the diagrammatic view represented in Fig. 12 of the drawings, so that the said gear disks or wheels 104 will be actuated at different intervals and successively to properly actuate the registering-disks of the register or adding device which it is desired to use with the apparatus. Each arm 110 during its revolution comes in contact with a roller 112 on an arm 111, pivotally supported on a rod or bar 113, whereby it is moved down into the slotted portion of a post 114 and against the action of a spring 115, a link 116 between the said arm 111 and the oscillating arm 106 causing said arm 106 to oscillate and raise the finger 107 in operative lifting engagement with the pawl or dog 103 in the manner and for the purposes above stated. The manner of actuating the registering-disks of the register or adding device from the said actuated gear wheels or disks 104 will be more fully described hereinafter.

Referring now to Figs. 10 and 11, it will be seen that the previously-mentioned bar or plate like member 13 is provided with a guide portion or slot 117 and ears 118, in which there is a pin 119, which extends into an elongated opening 120 in a lock-plate 121, slidably arranged in said slot 117. This plate 121 is provided in its upper edge with alternately-disposed recesses 122 and raised parts 123, the said recess 122 normally being located directly beneath the slots 36 in the bolts 30, as illustrated in Figs. 8 and 10, so as not to interfere with the forward movement of the bolt 30 when actuated by the depressed key-lever. When, however, the bolt 30 has moved forward to the actuated position, (indicated in Fig. 9,) then the said lock-plate 121 will have moved laterally a sufficient distance to bring the raised portions 123 directly into the slot 37 of the actuated bolt 30 and into the slots 36 of the non-actuated bolts 30, whereby all the key-levers 21 are completely locked until the shaft 43 has made one complete revolution, and the lock-plate is again returned to its normal initial position by the action of a spring 124, which is attached to said plate 121 and the side 2 of the casing, as shown. That the said lock-plate 121 will be moved into its locking relation with the bolts 30, as indicated in Fig. 11, a cam-disk 125 has been secured on the main shaft 43, the said disk 125 having a roller 126, secured to an oscillating arm 127, which is pivoted on a post or bracket 128 on the side 2 in rolling contact with its cam-surface, as clearly illustrated. The upper portion of said arm 127 has a bifurcated member or saddle 129, which fits over the lock-plate 121 and is pivotally attached thereto by means of a pin 130. The action of these parts will be clearly understood from an inspection of said Figs. 10 and 11. As soon as the mechanism has again caused the lock-plate 121 to return to its initial position, (indicated in Fig. 10,) thereby bringing the various recesses 122 in alinement with the respective slots in the bolts 30, the stud or projection 48' on the previously-mentioned disk 48 on the main shaft 43 is brought into lifting engagement with the free end of an arm 121, oscillating on a rod 132. This action pulls down the opposite portion of said arm 131 and by means of a link 133, which is attached to said opposite portion and the previously-mentioned plate 40, causes the disengagement of the holding end 42 of the plate 40 from the recess 35 of the actuated bolt or bolts 30 (indicated in Fig. 9) to cause the springs 28 to again return the bolt or bolts 30 and the key lever or levers 21 to their normal initial positions. (Clearly indicated in Fig. 8.) At the same time the projection 57 of the arm 56 has again passed upon the projection 55 of the disk 54, whereby the stem or post 58 is again brought into its holding engagement with the fixed gear-teeth 61 of the drum 60. The bolt or bolts 30 having been returned to their initial positions, the dog 66 is also once more brought into its holding engagement with the said gear-teeth 61. The various devices herein described are arranged in sets of four, so as to indicate numbers of four digits, thus two dollar-digits and two cent-digits, employing nine key-levers with each set; but it will be understood that I do not limit myself to the use of such four sets of mechanism, for at a slight expense the apparatus can be built to have any number of sets of mechanism side by side to indicate amounts of any number of digits, or I may use less than four sets of mechanism; but for all practical purposes four sets are sufficient and are preferable with cash-registers.

Having stated hereinbefore that on the return movement of the drum or drums 60 the loose gear wheels or disks 104 are also actuated by means of the pawl or pawls 103 to operate the registering device, I will now set forth one arrangement and construction of such device.

Referring now more particularly to Figs. 2, 3, 4, 5, 13, and 14, it will be seen that I have arranged on a rod 134, which is suitably secured in bearings 135 in or upon the sides 2 of the shell or casing at the left-hand portion of said rod, a gear 136, the said gear being connected with and secured upon a sleeve 137, rotatively arranged upon the said rod 134. At the opposite end of said sleeve is secured a gear-wheel 138, having the usual peripheral gear-teeth, but one of said teeth 139 being made much wider than the remaining teeth, so as to extend in close proximity to the side of a number-indicating disk 141, rotatively arranged upon the spindle or rod 142, held in bearings 143, extending from the plate or bar 70, as shown. The peripheral gear-teeth of the wheel 138 are in operative engagement with the toothed hub 144 of the registering-wheel 140 to register the "tens" amounts in the dollar-column. At every tenth turn of the gear-wheel 138 the tooth 139 of said wheel will engage a tooth in the hub part 145 of the next higher wheel 141 for registering the "hundreds" amounts in the dollar-column. The said disk 141 is also provided with a laterally-extending tooth 146, which at every tenth turn meshes with a toothed wheel 147, loosely arranged on the sleeve 137, to move it a distance equal to one tooth. This gear-wheel 147 meshes with the toothed hub 149 of a registering-disk 148, and thus at every tenth turn indicates the number in the "thousands" dollar-column of the registering device. Collars 150 and 151 are respectively arranged upon the sleeve 137 and the rod 134, as shown, and upon the rod 134 and against the sleeve 151 is rotatively arranged a gear-wheel 152, which is in mesh with the loose gear 104, arranged on the rod 62 between the first and second drum 60, reading Fig. 6 of the drawings from left to right. This gear-wheel 152 has its peripheral gear-teeth in mesh with the toothed hub 154 of the indicating or registering disk 153 for indicating the "units" amount in the dollar-column. The said gear-wheel 152 is also made with a laterally-extending tooth 155, which at every tenth turn of the wheel 152 engages the toothed hub 156 of the previously-mentioned disk 140 for the purpose of moving the said disk one space. In like manner there is arranged upon said rod 134 a toothed wheel 157, which meshes with the tens indicating-disk 158 of the cents-column, said wheel 157 having a laterally-extending tooth 159 made to engage at every tenth turn with the toothed hub 160 of the next higher registering disk or wheel 153. This wheel 157 is actuated from the loose gear 104, arranged between the second and third drums 60, reading Fig. 6 from left to right. A sleeve or collar 161 is arranged upon the rod 134 between the said gear-wheel 157 and the one edge of the tubular sleeve 162, rotatively arranged on said rod 134. Upon this sleeve 162 I have secured a toothed wheel 163, which actuates the "units-disk" 164 of the cents-column, said wheel 163 also being provided with a laterally-extending tooth 165, which at every tenth turn of the wheel 163 engages with the toothed hub 166 of the registering-disk 158 and moves the same one space. The said sleeve 162 has secured thereon a gear 167, which is in mesh with the loose gear 104 at the extreme right of the right-hand drum 60, located on the rod 62. Thus it will be evident that any one or more of said drums 60 can be moved from their initial positions, indicated in Fig. 3, in the direction of the arrow in said figure, without in the least actuating the registering mechanism, because the gears or wheels 104 are loose upon the rod 62, and hence do not act; but on the return of any one or more of the said drums or cylinders 60 these gears 104 become active, and thereby actuate the proper indicating or registering disks of the registering device in the manner just described.

Within a chambered portion of the gear-wheel 147 is a spring-actuated bolt 168, having a chamfered end 170 extending into a recess in the collar 150, as illustrated in Fig. 14. This permits of a rotary movement of the wheel 147 in one direction when it is to actuate the disk 148, but prevents the rotation of said wheel 147 in the opposite direction except with the turning of the rod 134 by means of a finger-piece 171 when it is desired to turn all the registering-disks back to their zero-indicating positions.

In connection with the toothed hubs of the disks 148, 141, 140, 153, 158, and 164 are used the usual spring-controlled pawls 172, and with the gear-wheels 138, 152, 157, and 163 I prefer to employ the usual spring-dogs 173, as clearly illustrated in Fig. 15 of the drawings, the uses and operations of these devices being well known.

From the above description of my present invention it will be clearly seen that a simply-constructed and efficiently-operating mechanism for cash-registers has been constructed in which the parts are reduced to a minimum, and there is therefore less liability of the parts getting out of order. Furthermore, it will be evident that the key-levers if wrongly set can be returned to their normal positions to permit of the setting of the proper key-levers all without in the least having interfered with the normally inoperative positions of the remaining parts and mechanisms of the apparatus. It will also be evident that as long as none of the bolts 30 have been actuated by the key-levers coöperating therewith the crank-handle and the main shaft may be turned without in the least operatively actuating any of the mechanism of the apparatus, this mechanism being actuated only at such times when one or more pawls 66 have been raised by the inward movement of the actuated bolt or bolts in the manner hereinabove described.

I am fully aware that changes may be made in the various arrangements and combinations of the devices and their parts, as well as in the details of the construction of the same, without departing from the scope of my present invention. Hence I do not limit my invention to the exact arrangements and combinations of the devices and their parts as described in the foregoing specification and as illustrated in the accompanying drawings; nor do I confine myself to the exact details of the construction of the said parts.

Having thus described my invention, what I claim is—

1. In a cash-register, the combination, with an indicating-drum, of a plate-like member having rearwardly-extending guides, a series of key-levers pivotally connected with said plate-like member, a sliding bolt between each pair of guides actuated from each key-lever, and intermediate controlling mechanism for actuating said indicating-drum when a bolt has been actuated, substantially as and for the purposes set forth.

2. In a cash-register, the combination, with a normally locked indicating mechanism, of a plate-like member having rearwardly-extending guides, a series of key-levers pivotally connected with said plate-like member, said key-levers acting independent of said indicating mechanism, so that said key-levers can be set without releasing said indicating mechanism, substantially as and for the purposes set forth.

3. In a cash-register, the combination, with a normally locked indicating mechanism, of a plate-like member having rearwardly-extending guides, a series of key-levers pivotally connected with said plate-like member, said key-levers acting independent of said indicating mechanism, a sliding bolt between each pair of guides actuated from each key-lever, and means connected with said indicating mechanism arranged to engage with the actuated bolt, substantially as and for the purposes set forth.

4. In a cash-register, the combination, with a normally locked indicating mechanism, of a plate-like member having rearwardly-extending guides, a series of spring-controlled key-levers pivotally connected with said plate-like member, said key-levers acting independent of said indicating mechanism, so that said key-levers can be set without releasing said indicating mechanism, substantially as and for the purposes set forth.

5. In a cash-register, the combination, with a normally locked indicating mechanism, of a plate-like member having rearwardly-extending guides, a series of spring-controlled key-levers pivotally connected with said plate-like member, said key-levers acting independent of said indicating mechanism, a sliding bolt between each pair of guides actuated from each key-lever, and means connected with said indicating mechanism arranged to engage the actuated bolt, substantially as and for the purposes set forth.

6. In a cash-register, the combination, with a normally locked indicating mechanism, of a plate-like member having rearwardly-extending guides, a series of key-levers pivotally connected with said plate-like member, said key-levers acting independent of said indicating mechanism, so that said key-levers can be set without releasing said indicating mechanism, and means coöperating with said key-levers to lock said levers, substantially as and for the purposes set forth.

7. In a cash-register, the combination, with a normally locked indicating mechanism, of a series of key-levers acting independent of said indicating mechanism, a sliding bolt actuated from each key-lever, means connected with said indicating mechanism arranged to engage with the actuated bolt, and a locking means coöperating with said bolts to lock all of the levers, substantially as and for the purposes set forth.

8. In a cash-register, the combination, with an indicating mechanism, of a plate-like member having rearwardly-extending guides, a series of key-levers pivotally connected with said plate-like member, a sliding bolt between each pair of guides actuated from each key-lever, a controlling-cylinder, a rod on which said cylinder is movably arranged, and an actuating-spring connected at one end with said cylinder and at the other end with said rod, and stops on said cylinder with which said bolts can be brought in holding engagement, substantially as and for the purposes set forth.

9. In a cash-register, the combination, with an indicating mechanism, of a plate-like member having rearwardly-extending guides, a series of key-levers pivotally connected with said plate-like member, a sliding bolt between each pair of guides actuated from each key-lever, a controlling-cylinder, a rod on which said cylinder is movably arranged, an actuating-spring connected at one end with said cylinder and at the opposite end with said rod, and stops on said cylinder with which said bolts can be brought in holding engagement, a main driving-shaft, and means between said main shaft and said cylinder for returning said cylinder to its normal initial position and actuating the said indicating mechanism, substantially as and for the purposes set forth.

10. In a cash-register, the combination, with a series of key-levers, of a controlling-cylinder, a holding means connected with said key-levers normally in holding engagement with said cylinder, means for removing said cylinder from its held engagement with said holding means of said key-levers, a rod on which said cylinder is movably arranged, and an actuating-spring connected at one end with said cylinder and at the opposite end with said rod, substantially as and for the purposes set forth.

11. In a cash-register, the combination, with a series of key-levers, of a controlling-cylinder, a holding means connected with said key-levers normally in holding engagement with said cylinder, means for removing said cylinder from its held engagement with said holding means of said key-levers, a rod on which said cylinder is movably arranged, an actuating-spring connected at one end with said cylinder and at the opposite end with said rod, a main driving-shaft, and means between said main shaft and said cylinder for returning said cylinder to its normal initial position and actuating the said indicating mechanism, substantially as and for the purposes set forth.

12. In a cash-register, the combination, with a series of key-levers, of a plate-like member to which said key-levers are pivoted, said plate-like member having rearwardly-extending guides, a sliding bolt between each pair of guides actuated from each key-lever, a controlling-cylinder, and spirally-arranged stops on said cylinder with any one of which the actuated bolt is brought in engagement, substantially as and for the purposes set forth.

13. In a cash-register, the combination, with an indicating mechanism and a series of key-levers, of a sliding bolt actuated from each key-lever, a controlling-cylinder, spirally-arranged stops on said cylinder with any one of which the actuated bolt is brought in engagement, a main driving-shaft, and means between said main shaft and said cylinder for returning said cylinder to its normal initial position and actuating the indicating mechanism of the cash-register, substantially as and for the purposes set forth.

14. In a cash-register, the combination, with a series of key-levers, of a plate-like member to which said key-levers are pivoted, said plate-like member having rearwardly-extending guides, a sliding bolt between each pair of guides actuated from each key-lever, a controlling-cylinder, spirally-arranged stops on said cylinder with any one of which the actuated bolt is brought in engagement, a rod on which said cylinder is movably arranged, and an actuating-spring connected at one end with said cylinder and at the opposite end with said rod, substantially as and for the purposes set forth.

15. In a cash-register, the combination, with a series of controlling key-levers, of a sliding bolt actuated from each key-lever, a controlling-cylinder, spirally-arranged stops on said cylinder with any one of which the actuated bolt is brought in engagement, a rod on which said cylinder is movably arranged, an actuating-spring connected at one end with said cylinder and at the opposite end with said rod, a main driving-shaft, and means between said main shaft and said cylinder for returning said cylinder to its normal initial position and actuating the indicating mechanism of the cash-register, substantially as and for the purposes set forth.

16. In a cash-register, the combination, with a series of key-levers, of a sliding bolt actuated from each key-lever, a controlling-cylinder, a locking means between said cylinder and said bolts, spirally-arranged stops on said cylinder with one of which the actuated bolt is brought in engagement, a rod on which said cylinder is movably arranged, and an actuating-spring connected at one end with said cylinder and at the opposite end with said rod, substantially as and for the purposes set forth.

17. In a cash-register, the combination, with an indicating mechanism and a series of key-levers, of a sliding bolt actuated from each key-lever, a controlling-cylinder, a locking means between said cylinder and said bolts, spirally-arranged stops on said cylinder with any one of which the actuated bolt is brought in engagement, a rod on which said cylinder is movably arranged, and an actuating-spring connected at one end with said cylinder and at the opposite end with said rod, a main driving-shaft, and means between said main shaft and said cylinder for returning said cylinder to its normal initial position and actuating the indicating mechanism of the cash-register, substantially as and for the purposes set forth.

18. In a cash-register, the combination, with a spindle, of an indicating-drum on said spindle, a pinion on said spindle, a swing-frame suspended from said spindle so as to oscillate thereon, a rack in said frame in mesh with said pinion, a controlling-cylinder, gear-teeth on said cylinder, and a gear-wheel 83 journaled on said swing-frame in mesh with the gear-teeth on said cylinder and with said rack, substantially as and for the purposes set forth.

19. In a cash-register, the combination, with a spindle, of an indicating-drum on said spindle, a pinion on said spindle, a swing-frame suspended from said spindle so as to oscillate thereon, a rack in said frame in mesh with said pinion, a controlling-cylinder, gear-teeth on said cylinder, a gear-wheel 83 journaled on said swing-frame in mesh with the gear-teeth on said cylinder and with said rack, and means connected with said swing-frame for forcing said gear-wheel 83 from its engagement with the gear-teeth on said cylinder, substantially as and for the purposes set forth.

20. In a cash-register, the combination, with a spindle, of an indicating-drum on said spindle, a pinion on said spindle, a swing-frame suspended from said spindle so as to oscillate thereon, a rack in said frame in mesh with said pinion, a controlling-cylinder, gear-teeth on said cylinder, a gear-wheel 83 journaled on said swing-frame in mesh with the gear-teeth on said cylinder and with said rack, means connected with said swing-frame for forcing said gear-wheel 83 from its engagement with the gear-teeth on said cylinder, and means for again forcing said gear-wheel 83 in operative engagement with the gear-teeth on said cylinder, consisting, essentially, of a shaft 50, a disk 52 on said shaft provided with a depression 53, an oscillating lever 100, a roller on said lever in engagement with said disk 52 and its depression, and a link between said lever 100 and said swing-frame, substantially as and for the purposes set forth.

21. In a cash-register, the combination, with a spindle, of an indicating-drum on said spindle, a pinion on said spindle, a swing-frame suspended from said spindle so as to oscillate thereon, a rack in said frame in mesh with said pinion, a controlling-cylinder, gear-teeth on said cylinder, a gear-wheel 83 journaled on said swing-frame in mesh with the gear-teeth on said cylinder and with said rack, means connected with said swing-frame for forcing said gear-wheel 83 from its engagement with the gear-teeth on said cylinder, means for again forcing the gear-wheel 83 in operative engagement with the gear-teeth on said cylinder, consisting, essentially, of a shaft 50, a disk 52 on said shaft provided with a depression 53, an oscillating lever 100, a roller on said lever in engagement with said disk 52 and its depression, and a link between said lever 100 and said swing-frame, and means for actuating said shaft 50, comprising, a main shaft 43, a gear 47 on said main shaft, and a gear 49 on said shaft 50 in mesh with the gear 47, substantially as and for the purposes set forth.

22. In a cash-register, the combination, with a series of key-levers, an upwardly-extending arm 24 on each key-lever, and a hook end on each arm 24, of a spindle, a pinion on said spindle, a swing-frame suspended from said spindle, a rack in said frame in mesh with said pinion, a controlling-cylinder, gear-teeth on said cylinder, a gear-wheel 83 journaled on said swing-frame in mesh with the gear-teeth on said cylinder and with said rack, and means connected with said swing-frame and said arm 24 for forcing said gear-wheel 83 from its engagement with the gear-teeth on said cylinder, substantially as and for the purposes set forth.

23. In a cash-register, the combination, with a series of key-levers, an upwardly-extending arm 24 on each key-lever, and a hook end on each arm 24, of a spindle, a pinion on said spindle, a swing-frame suspended from said spindle, a rack in said frame in mesh with said pinion, a controlling-cylinder, gear-teeth on said cylinder, a gear-wheel 83 journaled on said swing-frame in mesh with the gear-teeth on said cylinder and with said rack, and means connected with said swing-frame and said arm 24 for forcing said gear-wheel 83 from its engagement with the gear-teeth on said cylinder, consisting, essentially, of an oscillating lever comprising the arm portions 91 and 92, a hook end on said arm portion 91 in engagement with said swing-frame, and a link between said arm portion 92 and the arm 24, substantially as and for the purposes set forth.

24. In a cash-register, the combination, with a series of key-levers, an upwardly-extending arm 24 on each key-lever, and a hook end on each arm 24, of a spindle, a pinion on said spindle, a swing-frame suspended from said spindle, a rack in said frame in mesh with said pinion, a controlling-cylinder, gear-teeth on said cylinder, a gear-wheel 83 journaled on said swing-frame in mesh with the gear-teeth on said cylinder and with said rack, means connected with said swing-frame and said arm 24 for forcing said gear-wheel 83 from its engagement with the gear-teeth on said cylinder, and means for again forcing said gear-wheel 83 in operative engagement with the gear-teeth on said cylinder, consisting, essentially, of a shaft 50, a disk 52 on said shaft provided with a depression 53, an oscillating lever 100, a roller on said lever in engagement with said disk 52 and its depression, and a link between said lever 100 and said swing-frame, substantially as and for the purposes set forth.

25. In a cash-register, the combination, with a series of key-levers, an upwardly-extending arm 24 on each key-lever, and a hook end on each arm 24, of a spindle, a pinion on said spindle, a swing-frame suspended from said spindle, a rack in said frame in mesh with said pinion, a controlling-cylinder, gear-teeth on said cylinder, a gear-wheel 83 journaled on said swing-frame in mesh with the gear-teeth on said cylinder and with said rack, means connected with said swing-frame and said arm 24 for forcing said gear-wheel 83 from its engagement with the gear-teeth on said cylinder, means for again forcing said gear-wheel 83 in operative engagement with the gear-teeth on said cylinder, consisting, essentially, of a shaft 50, a disk 52 on said shaft provided with a depression 53, an oscillating lever 100, a roller on said lever in engagement with said disk 52 and its depression, and a link between said lever 100 and said swing-frame, said means for forcing said gear-wheel 83 from its engagement with the gear-teeth on said cylinder, consisting, of an oscillating lever comprising the arm portions 91 and 92, a hook end on said arm 91 in engagement with said swing-frame, and a link between said arm portion 92 and the arm 24, substantially as and for the purposes set forth.

26. In a cash-register, the combination, with a spindle, of an indicating-drum on said spindle, a pinion on said spindle, a swing-frame suspended from said spindle, a guide in said frame, a rack slidably arranged in said guide, and means for actuating said rack to rotate the indicating-drum, substantially as and for the purposes set forth.

27. In a cash-register, the combination, with a spindle, of an indicating-drum on said spindle, a pinion on said spindle, a swing-frame suspended from said spindle, a guide in said frame, a rack slidably arranged in said guide, and means for actuating said rack to rotate the indicating-drum, consisting, essentially, of a gear 83 in mesh with said rack, and a controlling-cylinder provided with gear-teeth in mesh with said gear 83, substantially as and for the purposes set forth.

28. In a cash-register, the combination, with a spindle, of an indicating-drum on said spindle, a pinion on said spindle, a swing-frame suspended from said spindle, a guide in said frame, a rack slidably arranged in said guide, a controlling-drum provided with gear-teeth, a gear 83 normally in mesh with the gear-teeth of said controlling-drum and with the rack, means for forcing said gear 83 from its engagement with the gear-teeth of said controlling-drum, a spring between said rack and the swing-frame for forcing said rack down when the gear 83 is in its disengaged position, means for forcing said gear 83 once more in engaged relation with the controlling-drum, and means for rotating said drum and raising the rack, substantially as and for the purposes set forth.

29. In a cash-register, the combination, with a spindle, of an indicating-drum on said spindle, a pinion on said spindle, a swing-frame suspended from said spindle, a guide in said frame, a rack slidably arranged in said guide, a controlling-drum provided with gear-teeth, a gear 83 normally in mesh with the gear-teeth of said controlling-drum and with the rack, means for forcing said gear 83 from its engagement with the gear-teeth of said controlling-drum, a spring between said rack and the swing-frame for forcing said rack down when the gear 83 is in its disengaged position, means for forcing said gear 83 once more in engaged relation with the controlling-drum, and means for rotating said drum and raising said rack, consisting of an extension connected with said controlling-drum, a spring-pawl on said extension, an oscillating arm 106 and a bifurcated finger connected with said arm 106, a rod 113, a lever 111 pivotally arranged on said rod 113, a link 116 between said arm 111 and the oscillating arm 106, and means for raising and lowering said arm 111, substantially as and for the purposes set forth.

30. In a cash-register, the combination, with a spindle, of an indicating-drum on said spindle, a pinion on said spindle, a swing-frame suspended from said spindle, a guide in said frame, a rack slidably arranged in said guide, a controlling-drum provided with gear-teeth, a gear 83 normally in mesh with the gear-teeth of said controlling-drum and with the rack, means for forcing said gear 83 from its engagement with the gear-teeth of said controlling-drum, a spring between said rack and the swing-frame for forcing said rack down when the gear 83 is in its disengaged position, means for forcing said gear 83 once more in engaged relation with the controlling-drum, and means for rotating said drum and raising said rack, consisting of an extension connected with the controlling-drum, a spring-pawl on the extension, an oscillating arm 106 and a bifurcated finger connected with said arm 106, a rod 113, a lever 111 pivotally connected with said arm 106, and means for raising and lowering said arm 111, comprising, a shaft 50, a cam on said shaft, a roller 112 on said arm 111 in rolling contact with said cam, and means for actuating said shaft 50, substantially as and for the purposes set forth.

31. In a cash-register, the combination, with a controlling-cylinder provided with gear-teeth, of a main driving-shaft, a shaft 50 driven from said main shaft, and means connected with both shafts for retaining said drum normally in its locked relation, substantially as and for the purposes set forth.

32. In a cash-register, the combination, with a controlling-cylinder provided with gear-teeth, of a main driving-shaft, a shaft 50 driven from said main shaft, an arm 56 pivotally arranged on said main shaft, a post on said arm 56 normally in holding engagement with the gear-teeth of said controlling-cylinder, and means on said shaft for raising and lowering said arm 56 and its post, substantially as and for the purposes set forth.

33. In a cash-register, the combination, with a controlling-cylinder provided with gear-teeth, of a main driving-shaft, a shaft 50 driven from said main shaft, an arm 56 pivotally arranged on said main shaft, a post on said arm 56 normally in holding engagement with the gear-teeth of said controlling-cylinder, and means on said shaft for raising and lowering said arm 56 and its post, consisting, of a disk 54 and a stud 55 on said disk 54 normally in lifting engagement with said arm 56, substantially as and for the purposes set forth.

34. In a cash-register, the combination, with a controlling-cylinder, a rod on which said cylinder is rotatably arranged, an extension on said cylinder, a spring attached at one end to said cylinder and at the other end to said rod for rotating said cylinder in one direction, and means connected with said extension for rotating said cylinder in an opposite direction, substantially as and for the purposes set forth.

35. In a cash-register, the combination, with a controlling-cylinder, a rod on which said cylinder is rotatably arranged, an extension on said cylinder, a spring attached at one end to said cylinder and at the other end to said rod for rotating said cylinder in one direction, and means connected with said extension for rotating said cylinder in an opposite direction, comprising, a spring-dog on said extension, an oscillating lever 106 on the rod on which said cylinder is arranged, a bifurcated finger 107 on said lever 106, a shaft 50, a cam on said shaft, a pivoted and spring-actuated lever 111 and a roller on said lever in rolling contact with said cam, and a link between said lever 111 and said oscillating lever 106 for forcing said finger 107 in engagement with said spring-dog, substantially as and for the purposes set forth.

36. In a cash-register, the combination, with a controlling-cylinder, a rod on which said cylinder is arranged, gear-teeth on said cylinder, of a key-lever, a sliding bolt actuated from said key-lever, a projection on said bolt, a pivoted and curved plate having an end portion in slidable engagement with said projection, and a pawl normally in holding engagement with the gear-teeth of the controlling-cylinder, substantially as and for the purposes set forth.

37. In a cash-register, the combination, with a controlling-cylinder, a rod on which said cylinder is arranged, gear-teeth on said cylinder, a spring attached at one end to said cylinder and at its opposite end to said rod, of a key-lever, a sliding bolt actuated from said key-lever, a nosing and a projection on said bolt, spirally-arranged stops on said cylinder adapted to be brought in engagement with said nosing, a pivoted and curved plate having an end portion in slidable engagement with said projection on the bolt, and a pawl normally in holding engagement with the gear-teeth of the controlling-cylinder, substantially as and for the purposes set forth.

38. In a cash-register, the combination, with the casing, and an indicating mechanism, and mechanism for actuating the indicating means, of a plate-like member having an open part 15 and guides 17, a sliding bolt in each guide, a rod in said open part 15, and a series of key-levers pivoted on said rod, each key-lever comprising an outwardly-extending arm provided with a finger-piece, an inwardly and upwardly extending arm 24, and a downwardly-extending arm 26, and a means of connection between said downwardly-extending arm and the bolt, and a link connected with said arm 24 adapted to be actuated by the movement of said arm, substantially as and for the purposes set forth.

39. In a cash-register, the combination, with the casing, and an indicating mechanism, and mechanism for actuating the indicating means, of a plate-like member having an open part 15 and guides 17, a sliding bolt in each guide, a rod in said open part 15, and a series of key-levers pivoted on said rod, each key-lever comprising an outwardly-extending arm provided with a finger-piece, an inwardly and upwardly extending arm 24, and a downwardly-extending arm 26, a means of connection between said downwardly-extending arm and the bolt, and springs in said plate-like member, said springs being operatively connected with said arms 26, substantially as and for the purposes set forth.

40. In a cash-register, the combination, with the casing, and an indicating mechanism, and mechanism for actuating the indicating means, of a plate-like member, having an open part 15 and guides 17, a sliding bolt in each guide, each bolt having a toothed member 34 and a recess 35, a series of key-levers pivotally arranged in said open part 15 and each lever being connected with a bolt, a pivoted and curved plate 40 having a chamfered edge normally in engagement with the member 34 of the bolt and arranged to slip into the recess when the bolt is actuated, substantially as and for the purposes set forth.

41. In a cash-register, the combination, with the casing, and an indicating mechanism, and mechanism for actuating the indicating means, of a plate-like member, having an open part 15 and guides 17, a sliding bolt in each guide, each bolt having a tooth-shaped member 34 and a recess 35, a series of key-levers pivotally arranged in said open part 15 and each lever being connected with a bolt, a pivoted and curved plate 40 having a chamfered edge normally in engagement with the member 34 of the bolt and arranged to slip into the recess when the bolt is actuated, and means for lowering the said plate 40, substantially as and for the purposes set forth.

42. In a cash-register, the combination, with the casing, and an operating mechanism, and mechanism for actuating the indicating means, of a plate-like member, having an open part 15 and guides 17, a sliding bolt in each guide, each bolt having a tooth-shaped member 34 and a recess 35, a series of key-levers pivotally arranged in said open part 15 and each lever being connected with a bolt, a pivoted and curved plate 40 having a chamfered edge normally in engagement with the member 34 of the bolt and arranged to slip into the recess when the bolt is actuated, and means for lowering the said plate 40, comprising, a main shaft 43, a disk on said shaft, a circumferential projection on said disk, a rod 132, an oscillating arm on said rod having one end in engagement with said disk and its projection, and a link between said oscillating arm and the curved plate, substantially as and for the purposes set forth.

43. In a cash-register, the combination, with the casing, and an indicating mechanism, and mechanism for actuating the indicating means, of a plate-like member, having an open part 15 and guides 17, a sliding bolt in each guide, a series of key-levers pivotally arranged in said open part 15 and each lever being connected with a bolt, each bolt being provided with holding-recesses 36 and 37, and a lock-plate also provided with recesses in slidable arrangement with the said recesses in the bolts, substantially as and for the purposes set forth.

44. In a cash-register, the combination, with the casing, and an indicating mechanism, and mechanism for actuating the indicating means, of a plate-like member having an open part 15 and guides 17, a sliding bolt in each guide, a series of key-levers pivotally arranged in said open part 15 and each lever being connected with a bolt, each bolt being provided with holding-recesses 36 and 37, and a spring-controlled lock-plate also provided with recesses in slidable arrangement with the said recesses in the bolts, substantially as and for the purposes set forth.

45. In a cash-register, the combination, with the casing, and an indicating mechanism, and mechanism for actuating the indicating means, of a plate-like member having an open part 15 and guides 17, a sliding bolt in each guide, a series of key-levers pivotally arranged in said open part 15 and each lever being connected with a bolt, each bolt being provided with holding-recesses 36 and 37, a lock-plate also provided with recesses in slidable arrangement with the recesses in said bolts, and means for producing the sliding movement of said lock-plate, comprising, a main shaft, a cam on said shaft, and an oscillating lever connected with said lock-plate, said lever being actuated by engagement with said cam, substantially as and for the purposes set forth.

46. In a cash-register, the combination, with the casing, and an indicating mechanism, and mechanism for actuating the indicating means, of a plate-like member having an open part 15 and guides 17, a sliding bolt in each guide, a series of key-levers pivotally arranged in said open part 15 and each lever being connected with a bolt, each bolt being provided with holding-recesses 36 and 37, a lock-plate also provided with recesses in slidable arrangement with the recesses in said bolts, and means for producing the sliding movement of said lock-plate, comprising, a main shaft, a cam on said shaft, and an oscillating lever connected at one end with said lock-plate, and a roller at the opposite end of said lever in rolling contact with said cam, substantially as and for the purposes set forth.

47. In a cash-register, the combination, with a plate-like member 13 provided with guides, of slide-bolts in said guides provided with holding-recesses 36 and 37, a guide 117 and lugs 118 on said plate-like member, and a pin in said lugs, a lock-plate slidably arranged in said guide 117, said lock-plate being provided in its upper edge with recesses 122 and projections 123, and with an elongated opening into which said pin is fitted, substantially as and for the purposes set forth.

48. In a cash-register, the combination, with a plate-like member 13 provided with guides, of slide-bolts in said guides provided with holding-recesses 36 and 37, a guide 117 and lugs 118 on said plate-like member, and a pin in said lugs, a lock-plate slidably arranged in said guide 117, said lock-plate being provided in its upper edge with recesses 122 and projections 123, and with an elongated opening into which said pin is fitted, and means for producing a sliding movement of said lock-plate, substantially as and for the purposes set forth.

49. In a cash-register, the combination, with a plate-like member 13 provided with guides, of slide-bolts in said guides provided with holding-recesses 36 and 37, a guide 117 and lugs 118 on said plate-like member, and a pin in said lugs, a lock-plate slidably arranged in said guide 117, said lock-plate being provided in its upper edge with recesses 122 and projections 123, and with an elongated opening into which said pin is fitted, and means for producing a sliding movement of said lock-plate, comprising a main shaft, a cam on said shaft, and an oscillating lever connected with said lock-plate, said lever being actuated by engagement with said cam, substantially as and for the purposes set forth.

50. In a cash-register, the combination, with a plate-like member 13 provided with guides, of slide-bolts in said guides provided with holding-recesses 36 and 37, a guide 117 and lugs 118 on said plate-like member, and a pin in said lugs, a lock-plate slidably arranged in said guide 117, said lock-plate being provided in its upper edge with recesses 122 and projections 123, and with an elongated opening into which said pin is fitted, and means for producing a sliding movement of said lock-plate, comprising a main shaft, a cam on said shaft, and an oscillating lever connected at one end with said lock-plate, and a roller at the opposite end of said lever in rolling contact with said cam, substantially as and for the purposes set forth.

51. In a cash-register, the combination, with a casing, an indicating means, and mechanism for actuating said indicating means, of a plate-like member having rearwardly-extending guides, a series of key-levers pivotally connected with said plate-like member, a sliding bolt between each pair of guides actuated from each key-lever, a controlling-cylinder, a rod on which said cylinder is arranged, and stops, on said cylinder with which said bolts can be brought in holding engagement, a gear-wheel loosely arranged on said rod, normally being inactive, and means connected with said cylinder for rendering said gear active upon said rod, substantially as and for the purposes set forth.

52. In a cash-register, the combination, with a casing, an indicating means, and mechanism for actuating said indicating means, of a plate-like member having rearwardly-extending guides, a series of key-levers pivotally connected with said plate-like member, a sliding bolt between each pair of guides actuated from each key-lever, a controlling-cylinder, a rod on which said cylinder is arranged, and stops on said cylinder with which said bolts can be brought in holding engagement, a gear-wheel loosely arranged on said rod, normally being inactive, means connected with said cylinder for rendering said gear active upon said rod, and gear-wheels of a total adder or registering device actuated from said active gear, substantially as and for the purposes set forth.

53. In a cash-register, the combination, with a casing, an indicating means, and mechanism for actuating said indicating means, of a controlling-cylinder, a rod on which said cylinder is arranged, a gear-wheel loosely arranged on said rod, normally being inactive, an extension on said cylinder, a pawl on said extension, and means for causing the operative engagement of said pawl with said loose gear, substantially as and for the purposes set forth.

54. In a cash-register, the combination, with a casing, an indicating means, and mechanism for actuating said indicating means, of a controlling-cylinder, a rod on which said cylinder is arranged, a gear-wheel loosely arranged on said rod, normally being inactive, an extension on said cylinder, a pawl on said extension, means for causing the operative engagement of said pawl with said loose gear, and a registering device actuated from said gear, substantially as and for the purposes set forth.

55. In a cash-register, the combination, with a casing, an indicating means, and mechanism for actuating said indicating means, of a controlling-cylinder, a rod on which said cylinder is arranged, a gear-wheel loosely arranged on said rod, normally being inactive, an extension on said cylinder, a pawl on said extension, and means for causing the operative engagement of said pawl with said loose gear, consisting, essentially, of a shaft 50, a cam on said shaft, a rod 113, and an oscillating lever connected with said rod 113 and actuated by the said cam, an oscillating arm 106 on the rod on which said cylinder is arranged, a link between said arm 106 and said oscillating lever, and a finger on said arm 106 capable of engagement with the pawl on said extension, substantially as and for the purposes set forth.

56. In a cash-register, the combination, with a casing, an indicating means, and mechanism for actuating said indicating means, of a controlling-cylinder, a rod on which said cylinder is arranged, a gear-wheel loosely arranged on said rod, normally being inactive, an extension on said cylinder, a pawl on said extension, and means for causing the operative engagement of said pawl with said loose gear, consisting, essentially, of a shaft 50, a cam on said shaft, a rod 113, and an oscillating lever connected with said rod 113 and actuated by the said cam, an oscillating arm 106 on the rod on which said cylinder is arranged, a link between said arm 106 and said oscillating lever, and a finger on said arm 106 capable of engagement with the pawl on said extension, and a registering device actuated from said gear, substantially as and for the purposes set forth.

57. In a cash-register, a main shaft, a shaft 50, means between said shafts for rotating said shaft 50 from said main shaft, a series of controlling-cylinders, a rod on which said cylinders are arranged, a series of loose gears on said rod, a total-registering device comprising a number of indicating-disks, having disk-actuating gears in mesh with said loose gears, and means connected with said shaft 50 for successively rotating said cylinders and loose gears, substantially as and for the purposes set forth.

58. In a cash-register, a main shaft, a shaft 50, means between said shafts for rotating said shaft 50 from said main shaft, a series of controlling-cylinders, a rod on which said cylinders are arranged, a series of loose gears on said rod, a total-registering device comprising a number of indicating-disks, having disk-actuating gears in mesh with said loose gears, means connected with said shaft 50 for successively rotating said cylinders and loose gears, a series of successively-acting cams on said shaft 50, and means actuated by the said cams for successively rotating said drums and loose gears, substantially as and for the purposes set forth.

59. In a cash-register, a main shaft, a shaft 50, means between said shafts for rotating said shaft 50 from said main shaft, a series of controlling-cylinders, a rod on which said cylinders are arranged, a series of loose gears on said rod, a total-registering device comprising a number of indicating-disks, having disk-actuating gears in mesh with said loose gears, means connected with said shaft 50 for successively rotating said cylinders and loose gears, a series of successively-acting cams on said shaft 50, and means actuated by the said cams for successively rotating said drums and loose gears, comprising, an extension on each cylinder, a spring-dog on each extension, a series of oscillating levers 106 on the rod on which said cylinders are arranged, a bifurcated finger on each lever 106, a series of spring-supported levers 111, and a roller on each lever 111 in rolling contact with a cam, and a link between each lever 111 and each oscillating lever 106 for successively forcing the respective fingers on said oscillating levers 106 in engagement with the respective spring-dogs, substantially as and for the purposes set forth.

In testimony that I claim the invention set forth above I have hereunto set my hand this 11th day of April, 1903.

ALBERT PFAFF.

Witnesses:
FREDK. C. FRAENTZEL,
GEO. D. RICHARDS.